United States Patent [19]
Chi

[11] Patent Number: 5,106,210
[45] Date of Patent: Apr. 21, 1992

[54] BICYCLE HUB

[76] Inventor: Yi-Chen Chi, No. 139-5, An Mei Rd., Mei Shan Village, Hou Li Hsiang, Taichung Hsien, Taiwan

[21] Appl. No.: 674,800

[22] Filed: Mar. 25, 1991

[51] Int. Cl.⁵ .............................. F16C 23/08
[52] U.S. Cl. .................... 384/498; 384/510; 384/545
[58] Field of Search ............... 384/498, 510, 545, 540, 384/539, 560

[56] References Cited

U.S. PATENT DOCUMENTS

| | | |
|---|---|---|
| 3,428,377 | 2/1969 | Christian et al. ............... 384/545 |
| 4,124,257 | 11/1978 | Derner et al. ..................... 384/498 |
| 4,185,880 | 1/1980 | Shiomi et al. ..................... 384/498 |
| 5,002,407 | 3/1991 | Chi ..................................... 384/539 |

Primary Examiner—Lenard A. Footland
Attorney, Agent, or Firm—Zarley, McKee, Thomte, Voorhees & Sease

[57] ABSTRACT

A bicycle hub includes a pair of sleeves rotatably supported on an axle, and a dust cap having a cylindrical portion engaged on each of the sleeves. An outer peripheral surface of one sleeve is curved, and an inner peripheral surface of a cylindrical portion of a dust cap is curved and is rotatably engaged with the curved outer peripheral surface of the sleeve so that the axle is rotatable about the dust cap by engagement between the curved outer peripheral surface of the sleeve and the curved inner peripheral surface of the cylindrical portion.

2 Claims, 3 Drawing Sheets

BICYCLE HUB

BACKGROUND OF THE INVENTION

1. Field of the Invention

The present invention relates to a bicycle hub for supporting the pedal crank shaft of a bicycle.

2 Description of the Prior Art

The closest prior art of which the inventor is aware is his prior U.S. patent application Ser. No. 510,989, filed Apr. 18, 1990 (Yi Chen CHI, "A HUG OF A BICYCLE"), allowed on Oct. 10, 1990, now U.S. Pat. No. 5,002,407.

Generally, a bicycle hub includes two dust caps provided on both end portions of an axle and to be engaged with both end portions of a hub shell. However, when one of the dust caps is threadedly engaged to the hub shell, the axle may not precisely coincide with the axis of the hub shell so that the other dust cap can not be easily threadedly engaged into position.

The present invention has arisen to mitigate and/or obviate the afore-described disadvantages of the conventional bicycle hubs.

SUMMARY OF THE INVENTION

The primary objective of the present invention is to provide a bicycle hub in which the axle can be rotated relative to one end portion thereof so that the dust caps can be easily threaded into position.

In accordance with one aspect of the invention, there is provided a bicycle hub which includes a pair of sleeves rotatably supported on an axle, and a dust cap having a cylindrical portion engaged on each of the sleeves. An outer peripheral surface of one sleeve is curved, and an inner peripheral surface of a cylindrical portion of a dust cap is curved and is rotatably engaged with the curved outer peripheral surface of the sleeve so that the axle is rotatable about the dust cap by an engagement between the curved outer peripheral surface of the sleeve and the curved inner peripheral surface of the cylindrical portion.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
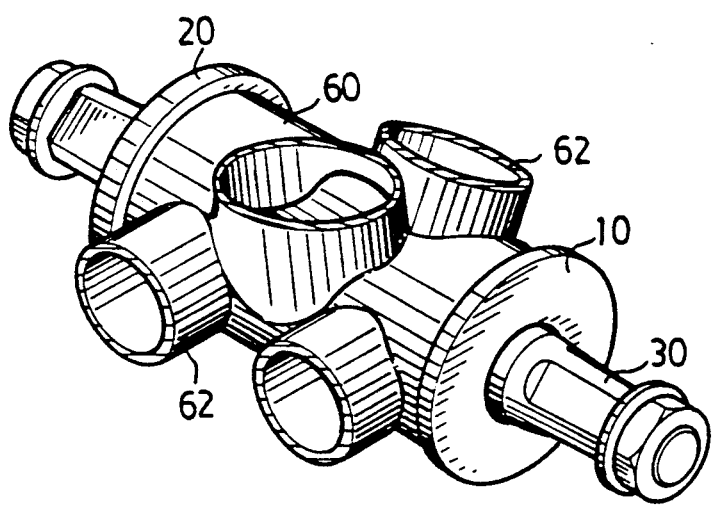
FIG. 1 is a perspective view of a bicycle hub in accordance with the present invention.
Figure 2:
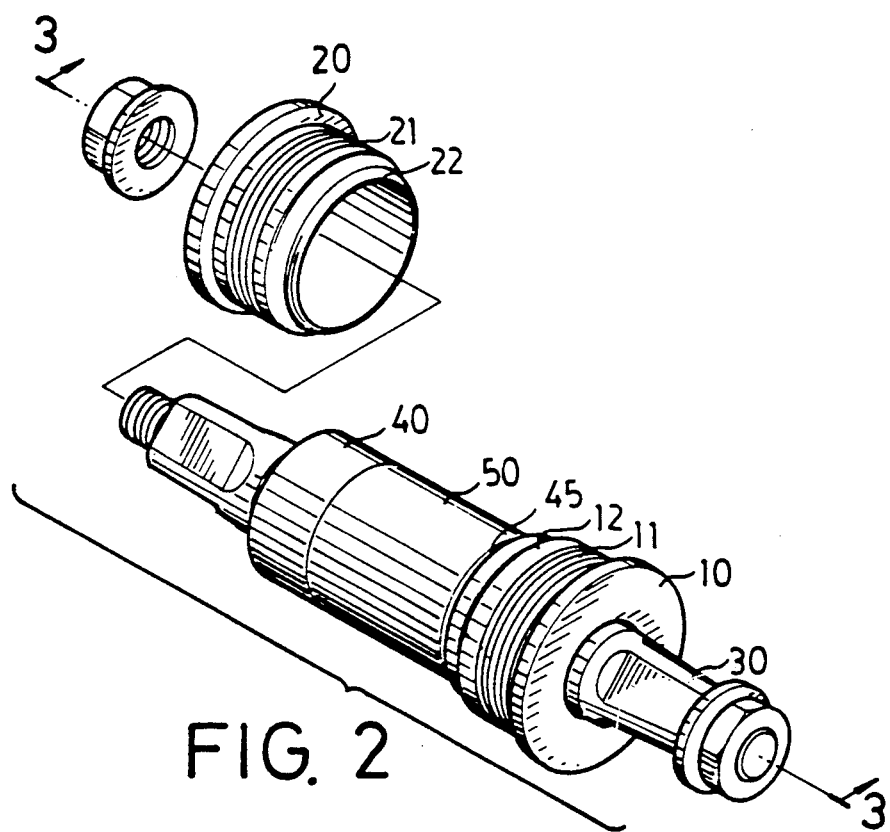
FIG. 2 is a partial exploded view of the bicycle hug.

Referring to the drawings and initially to FIGS. 1 and 2, a bicycle hub in accordance with the present invention comprises generally a pair of dust caps 10, 20 rotatably provided on an axle 30. The dust caps 10, 20 are threadedly engaged to both end portions of a hub shell 60 so that the axle 30 can be rotatably coupled to the hub shell 60. The hub shell 60 is supported by the standard frame members 62 of a bicycle.

Figure 3:
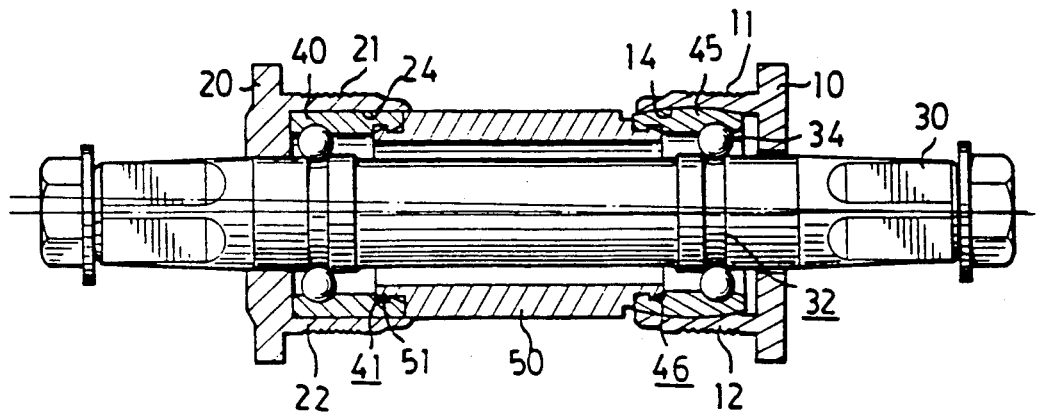
FIGS. 3 and 4 are cross sectional views taken along lines 3-3 of FIG. 2.

Referring next to FIG. 3 and again to FIG. 2, an outer thread 11, 21 is formed on an outer peripheral surface of a cylindrical portion 12, 22 of each of the dust caps 10, 20 for threadedly engaging to the hub shell 60. The inner peripheral surface 24 of the cylindrical portion 22 of the dust cap 20 is flat and the inner peripheral surface 14 of the cylindrical portion 12 of the dust cap 10 is slightly curved, as shown in FIG. 3.

A pair of annular grooves 32 are formed in the outer peripheral surface of the axle 30. A pair of sleeves 40, 45 are provided around the axle 30 and each of the sleeves 40, 45 has an annular recess 41, 46 formed in the inner peripheral surface thereof. A series of balls 34 are slidably engaged between each of the sleeves 40, 45 and the respective annular grooves 32, and act as bearing means so that the sleeves 40, 45 are free rotatable about the axle 30. A spacer 50 is provided between the sleeves 40, 45. A peripheral rib 51 is formed on each end portion of the spacer 50 and is configured to be engaged with the annular recess 41, 46 of the sleeves 40, 45 so that the sleeves 40, 45 can be spaced with a constant distance and can be suitably coupled together.

Figure 4:
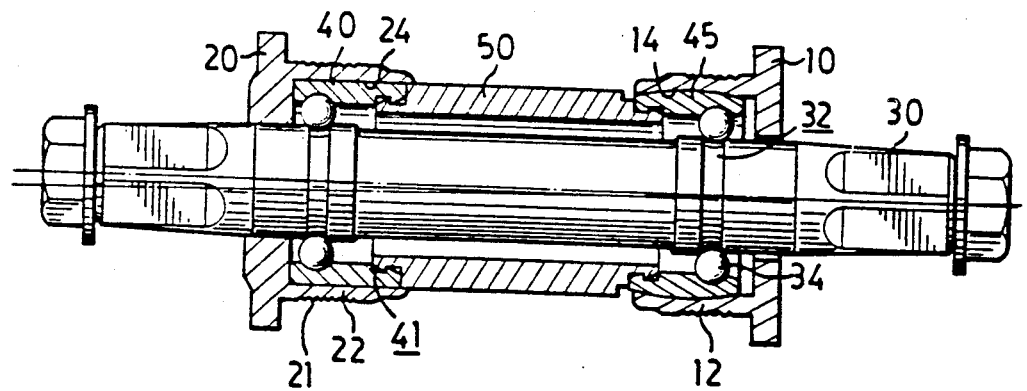

The outer peripheral surface of the sleeve 40 is flat and is configured to be engaged with the corresponding flat inner peripheral surface 24 of the cylindrical portion 22 of the dust cap 20. The outer peripheral surface of the other sleeve 45 is slightly curved corresponding to the curved inner peripheral surface 14 of the cylindrical portion 12 of the dust cap 10 and is configured to be engaged therewith so that the axle 30 and the sleeve 45 are rotatable about the dust cap 10 between the positions as shown in FIGS. 3 and 4 by the engagement between the curved peripheral surfaces of the sleeve 45 and the cylindrical portion 12 of the dust cap 10. The dust cap 10 is force-fitted onto the sleeve 45.

Accordingly, when the dust 10 is threadedly coupled to one end portion of the hub shell 60, the axle 30 can be rotated until the axis of the axle 30 coincides with the axis of the hub shell 60 so that the other dust cap 20 can be easily threadedly engaged to the other end portion of the hub shell 60.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle hub comprising a pair of sleeves rotatably supported on an axle, and a dust cap having a cylindrical portion engaged on each of said sleeves; characterized in that an outer peripheral surface of a first sleeve is curved, and an inner peripheral surface of a cylindrical portion of a first dust cap is curved and is rotatably engaged with said curved outer peripheral surface of said first sleeve so that said axle is rotatable about said first dust cap by engagement between said curved outer peripheral surface of said first sleeve and said curved inner peripheral surface of said cylindrical portion.

2. A bicycle hub according to claim 1, wherein a spacer is provided between said sleeves, an annular recess is formed in an inner peripheral surface of each of said sleeves, a peripheral rib is formed on each end portion of said spacer and is engagable with said annular recesses of said sleeves so that said sleeves can be spaced with a constant distance and can be coupled together.

* * * * *